(12) United States Patent
Sano et al.

(10) Patent No.: US 8,090,147 B2
(45) Date of Patent: Jan. 3, 2012

(54) MATCHING OBJECT AND REFERENCE PATTERN IMAGES USING SEARCH WINDOW SIZE WIDTHS AND HEIGHTS TO PREDICT OBJECT COLLISION

(75) Inventors: Hiroaki Sano, Hyogo (JP); Katsumi Sakata, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 1053 days.

(21) Appl. No.: 12/000,631

(22) Filed: Dec. 14, 2007

(65) Prior Publication Data

US 2008/0144888 A1 Jun. 19, 2008

(30) Foreign Application Priority Data

Dec. 19, 2006 (JP) .................................. 2006-341890

(51) Int. Cl.
*G06K 9/00* (2006.01)
*G06K 9/62* (2006.01)

(52) U.S. Cl. ........................................ 382/103; 382/209

(58) Field of Classification Search ................... 382/103
See application file for complete search history.

(56) References Cited

U.S. PATENT DOCUMENTS

| | | | | |
|---|---|---|---|---|
| 5,757,287 A * | 5/1998 | Kitamura et al. | ............. | 340/937 |
| 6,301,387 B1 * | 10/2001 | Sun et al. | ..................... | 382/217 |
| 6,363,160 B1 * | 3/2002 | Bradski et al. | ................. | 382/103 |
| 6,687,386 B1 * | 2/2004 | Ito et al. | ......................... | 382/103 |
| 6,792,134 B2 * | 9/2004 | Chen et al. | ..................... | 382/117 |
| 7,113,616 B2 * | 9/2006 | Ito et al. | ......................... | 382/103 |
| 2004/0054473 A1 * | 3/2004 | Shimomura | .................. | 701/301 |
| 2004/0125984 A1 * | 7/2004 | Ito et al. | ......................... | 382/103 |
| 2006/0072811 A1 * | 4/2006 | Porter et al. | ................... | 382/159 |

FOREIGN PATENT DOCUMENTS

| | | |
|---|---|---|
| JP | A 62-145489 | 6/1987 |
| JP | A-7-225127 | 8/1995 |
| JP | A 9-54830 | 2/1997 |
| JP | A-9-226490 | 9/1997 |
| JP | A-2002-352225 | 12/2002 |
| JP | A 2002-362302 | 12/2002 |
| JP | A-2004-13615 | 1/2004 |
| JP | A 2005-62910 | 3/2005 |
| JP | A-2005-128815 | 5/2005 |
| JP | A-2005-311691 | 11/2005 |
| JP | A-2006-10652 | 1/2006 |
| JP | A-2006-101384 | 4/2006 |
| JP | A-2006-202047 | 8/2006 |

* cited by examiner

*Primary Examiner* — David Zarka
(74) *Attorney, Agent, or Firm* — Oliff & Berridge, PLC (57) ABSTRACT

An image recognition apparatus includes a comparing unit that sequentially compares a reference pattern with an image in a search window having a shape corresponding to a size of an object to be determined in an input image while moving the search window relative to the input image to acquire a degree of coincidence between the reference pattern and the image in the search window, and a determining unit that determines that an object corresponding to the reference pattern is present in an area where the degree of coincidence is equal to or higher than a predetermined value when a width of the area corresponds to a width of the search window.

10 Claims, 5 Drawing Sheets

MATCHING OBJECT AND REFERENCE PATTERN IMAGES USING SEARCH WINDOW SIZE WIDTHS AND HEIGHTS TO PREDICT OBJECT COLLISION

BACKGROUND OF THE INVENTION

1. Field of the Invention

The present invention relates to an image recognition apparatus, an image recognition method, and an electronic control device for recognizing a specific object from an input image, and more particularly to an in-vehicle image recognition apparatus, an image recognition method, and an electronic control device for recognizing a pedestrian.

2. Description of the Related Art

While a vehicle is running, a collision avoidance particularly from a pedestrian is of great importance. Therefore, a technology has been recently proposed to recognize a pedestrian around a vehicle by using an image recognition and a radar detection (see, for example, Japanese Patent Application Laid-Open No. 2002-362302).

For avoiding the collision of a vehicle with a pedestrian, it is important to identify a relative position of the pedestrian from the vehicle in operation as well as to recognize the presence of the pedestrian. As disclosed in Japanese Patent Application Laid-Open No. 2005-62910, for example, a technology for calculating a distance to a pedestrian using a stereo camera has been proposed.

However, mounting plural cameras such as stereo cameras makes configuration complicated, pushes up the cost, and requires a high-performance processing unit to process respective images shot by the plural cameras.

Thus, one important task has been to develop a technology for finding a relative position of a pedestrian from a vehicle with high accuracy based on a single image shot by a camera.

SUMMARY OF THE INVENTION

It is an object of the present invention to at least partially solve the problems in the conventional technology.

According to one aspect of the present invention, an image recognition apparatus includes a comparing unit that sequentially compares a reference pattern with an image in a search window having a shape corresponding to a size of an object to be determined in an input image while moving the search window relative to the input image to acquire a degree of coincidence between the reference pattern and the image in the search window, and a determining unit that determines that an object corresponding to the reference pattern is present in an area where the degree of coincidence is equal to or higher than a predetermined value when a width of the area corresponds to a width of the search window.

According to another aspect of the present invention, an image recognition method includes sequentially comparing a reference pattern with an image in a search window having a shape corresponding to a size of an object to be determined in an input image while moving the search window relative to the input image to acquire a degree of coincidence between the reference pattern and the image in the search window, and determining that an object corresponding to the reference pattern is present in an area where the degree of coincidence is equal to or higher than a predetermined value when a width of the area corresponds to a width of the search window.

According to still another aspect of the present invention, an electronic control device includes a comparing unit that sequentially compares a reference pattern with an image in a search window having a shape corresponding to a size of an object to be determined in an input image while moving the search window relative to the input image to acquire a degree of coincidence between the reference pattern and the image in the search window, a determining unit that determines that an object corresponding to the reference pattern is present in an area where the degree of coincidence is equal to or higher than a predetermined value when a width of the area corresponds to a width of the search window, and a control unit that controls at least one of an operation of a vehicle and a notification to a driver when a collision with an object corresponding to the reference pattern is predicted based on a result of determination by the determining unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image recognition apparatus, an image recognition method, and an electronic control device according to the present invention will be described in detail below with reference to the accompanying drawings.

1. Overview of the Present Invention

The present invention relates to an image recognition apparatus, an image recognition method, and an electronic control device for recognizing a predetermined object from an image, and is suitable, for example, for recognizing a pedestrian from an image shot by an in-vehicle camera.

In image recognition, a reference pattern of an object to be recognized is prepared and compared with a predetermined area of an image. Based on the comparison, it is determined whether the object to be recognized is present in the area or not. The reference pattern is a characteristic pattern of an image of the object to be recognized. For example, when the object to be recognized is a pedestrian, a reference pattern can be obtained by extracting a characteristic from a group of shot images of a pedestrian.

In the comparison with the reference pattern, an area in the image may be directly compared with the reference pattern as in a simple pattern matching, though any techniques can be employed. For example, an area in the image may be subjected to frequency conversion through Fourier transform or the like for comparison.

A process procedure for recognizing a pedestrian from an image shot by an in-vehicle camera is described with reference to FIG. 1. Firstly, a search window of a predetermined shape is made to move relative to an input image shot by the in-vehicle camera. Images appear in the search window are sequentially compared with the reference pattern so that a transition of a degree of coincidence between the image in the search window and the reference pattern is obtained. If an area where the degree of coincidence is high in the transition of the degree of coincidence has a width within a predetermined range, it is determined that a pedestrian is present in the area.

Figure 1:
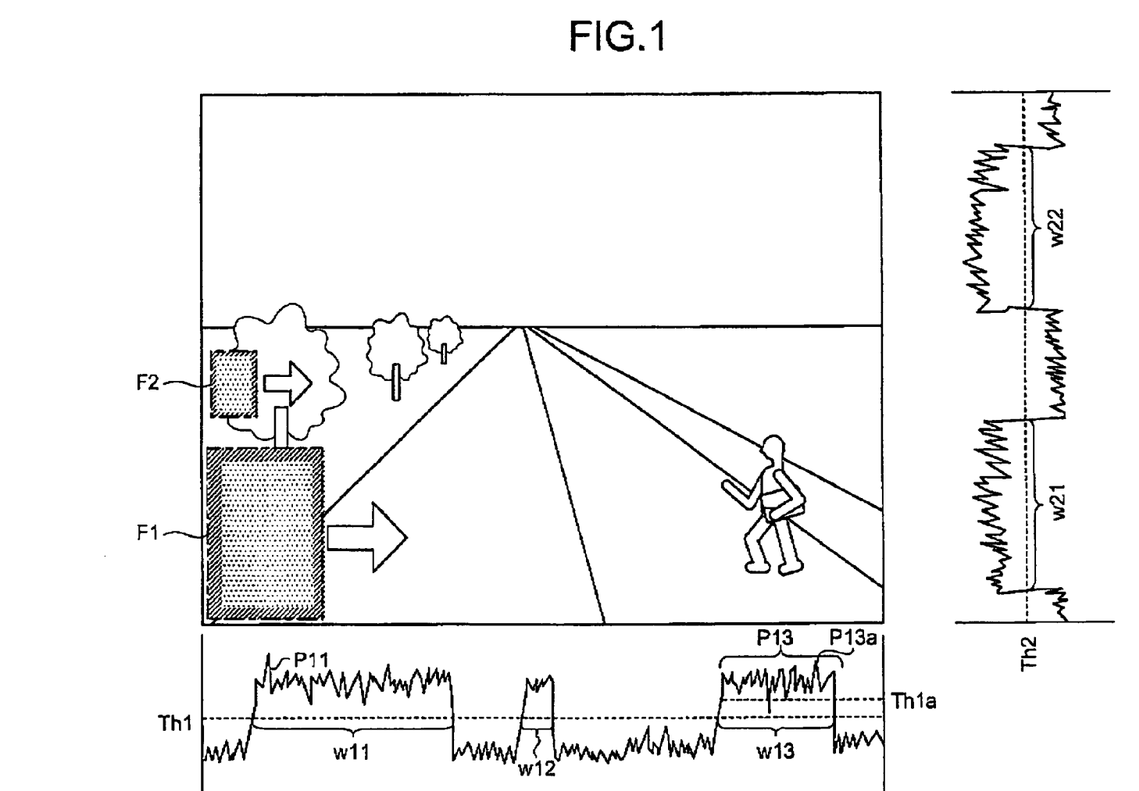
FIG. 1 is a schematic diagram for explaining an image recognition method according to the present invention.

In FIG. 1, a search window F1 moves from a lower left edge of an image toward the right, and the transition of the degree of coincidence is acquired. The presence and absence of the pedestrian is determined based on the width of an area where the degree of coincidence is equal to or higher than a threshold value Th1.

In a general pattern matching and the like, the pedestrian is determined to be present at a peak point of the degree of coincidence (for example, a peak P11 of FIG. 1). On the other hand, the present invention is mainly characterized in that it makes a determination based on the width of an area where the degree of coincidence is high.

In an example of FIG. 1, for example, the degree of coincidence exceeds the threshold Th1 in three areas. The widths of these areas are w11, w12, and w13, respectively. In the present invention, when the width of the area is within a predetermined range, it is determined that the object to be determined is present in the area. The predetermined range corresponds to the size of the object to be determined in the image.

In the recognition of a pedestrian, it the width of the area where the degree of coincidence is high is substantially the same as the width of the pedestrian in the image, it is determined that the pedestrian is present in the area.

In some conventional techniques, the shape of the search window is set to a rectangle of substantially the same size as the size of the object to be determined in the image. In the present embodiment, the width of the area where the degree of coincidence is high is compared with the shape (size) of the search window. When the width of the area is substantially equal to the width of the search window, for example, with a margin or error of 10%, it is determined that the object to be recognized is present within the area.

In the example of FIG. 1, the width w11 of one area is significantly larger than the horizontal width of the search window F1. Therefore, it is determined that the pedestrian is not in the area. Similarly, the width w12 of another area is significantly smaller than the horizontal width of the search window F1. Therefore, it is determined that the pedestrian is not in the area. On the other hand, the width w13 of the other area is substantially the same as the horizontal width of the search window F1. Therefore, it is determined that the image of the pedestrian is present in the area of the width w13.

Here, the position where the pedestrian is present is determined to be the area of the width w13. When the peak of the degree of coincidence is searched while the position of the search window is shifted, the peak value, in other words, a highest value of the degree of coincidence does not always appear in the center of the pedestrian image, for example, even within the area of the width w13. Therefore, if the position of the pedestrian image is determined based on a peak P13a which is off from the center of the pedestrian image as shown in FIG. 1, for example, the determined position of the pedestrian image is off from an actual position.

When the relative position of the pedestrian from the vehicle is calculated based on an input image shot by a single in-vehicle camera, the position of the pedestrian image in the whole image has significance. A method of finding the position of the pedestrian image based on the width of an area where the degree of coincidence is more accurate than a method of finding the position of the pedestrian image based on the peak value of the degree of coincidence, as described above. Therefore, when the former method is employed, the relative position of the pedestrian from the vehicle can be calculated with high accuracy.

The width of an area where the degree of coincidence is high can be found based on the number of points where the degree of coincidence exceeds a threshold value and a consecutiveness of the points. The consecutiveness may be defined as the number of points between a point where the degree of coincidence exceeds the threshold value and a point where the degree of coincidence becomes equal to or lower than the threshold value. Preferably, however, the consecutiveness is determined flexibly, for example, by taking into consideration a ratio of points where the degree of coincidence exceeds the threshold in a specific section, because the degree of coincidence may become equal to or lower than the threshold value accidentally, for example, when a threshold value Th1a is employed in the example of FIG. 1.

It is not always necessary to use the threshold value. Alternatively, a dimension value, which is a product of the degree of coincidence and the consecutiveness, may be employed for the determination of the area where the pedestrian is present.

A vertical position of the pedestrian can be determined in a similar manner to the determination of the horizontal position. It should be noted, however, that the search window employed for finding the image and its size in an area in an upper portion of the image is smaller than the search window employed for an area in a lower portion. This is because the pedestrian image in the upper portion of the image is an image of a pedestrian farther from the vehicle.

In FIG. 1, a search window F2 on the center left is smaller than the search window F1 at the lower left edge. When the position of the pedestrian is determined based on the vertical transition of the degree of coincidence, the width of the search window used as a reference is made smaller according to the height.

In FIG. 1, for example, an area with width w21 and an area with width w22 are obtained as areas where the degree of coincidence is high based on the transition of the degree of coincidence in the vertical direction. The widths w21 and w22 are substantially the same. However, when the height of these areas in the image is considered, though the width w21 is substantially equal to the vertical width of the corresponding search window of the same level, the width w22 is significantly larger than the vertical width of the corresponding search window of the same level. Therefore, in the example of FIG. 1, it is determined that the pedestrian image is present in the area of the width w21, and not in the area of the width w22.

2. Overall Configuration

Figure 2:
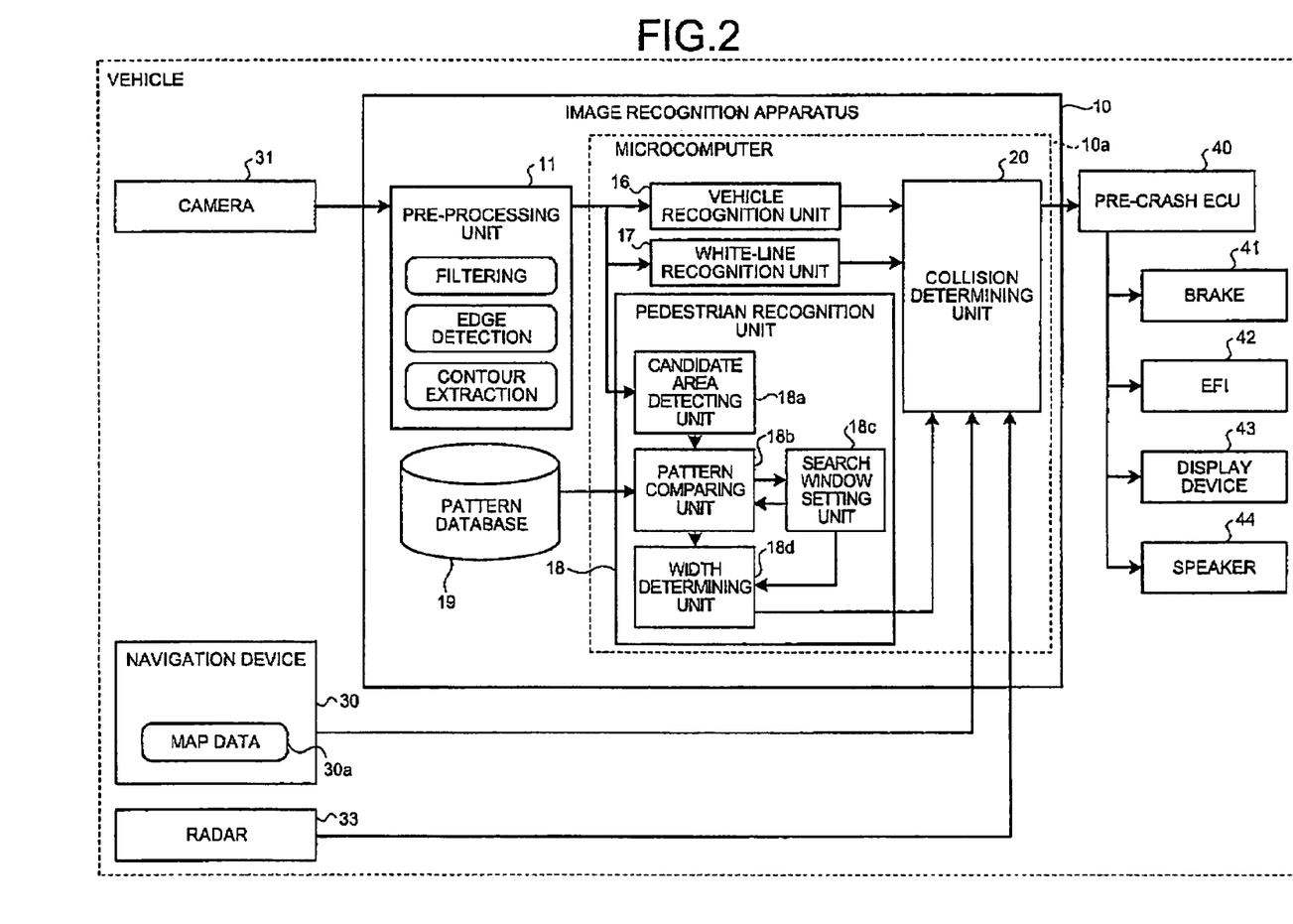
FIG. 2 is a schematic block diagram of an overall configuration of an image recognition apparatus according to one embodiment of the present invention.

An overall configuration of an image recognition apparatus 10 mounted on a vehicle according to one embodiment of the present invention is shown in FIG. 2. As shown in FIG. 2, the image recognition apparatus 10 mounted on a vehicle is connected to a navigation device 30, a camera 31, a radar 33, and a pre-crash electronic control unit (ECU) 40.

The navigation device 30 is an in-vehicle device that sets a driving route and guides the vehicle based on a position of the vehicle identified through communication with an artificial satellite of Global Positioning System (GPS) and map data 30a stored in advance. The navigation device 30 further provides positional information of the vehicle, map information of a surrounding area, a scheduled driving route, and the like to the image recognition apparatus 10.

The camera 31 shoots surroundings of the vehicle and inputs results of shooting to the image recognition apparatus 10. The radar 33 detects an object around the vehicle, measures a distance to the detected object, and inputs the results to the image recognition apparatus 10.

The pre-crash ECU 40 is an electronic control device that executes operation control of the vehicle with a brake 41 and an engine control device (EFI) 42 and notification with a display device 43 and a speaker 44 under the control of the image recognition apparatus 10 when the image recognition apparatus 10 predicts a collision of the vehicle.

The display device 43 is an output unit that gives a displayed notice to a user, i.e., a passenger of the vehicle. The speaker 44 is an output unit that gives an audio notice. The display device 43 and the speaker 44 give outputs under the control of the pre-crash ECU 40, and can be shared by various in-vehicle devices, such as the navigation device 30, and an in-vehicle audio device not shown.

The image recognition apparatus 10 includes a pre-processing unit 11, a vehicle recognition unit 16, a white-line recognition unit 17, a pedestrian recognition unit 18, a pattern database 19, and a collision determining unit 20. Here, it is preferable that the vehicle recognition unit 16, the white-line recognition unit 17, the pedestrian recognition unit 18, and the collision determining unit 20 are implemented, for example, by a single microcomputer 10a (a computing unit that includes a combination of a CPU, a ROM, and a RAM).

The pre-processing unit 11 performs processing, such as filtering, edge detection, and contour extraction, on an image shot by the camera 31, and outputs the processed image to the vehicle recognition unit 16, the white-line recognition unit 17, and the pedestrian recognition unit 18.

The vehicle recognition unit 16 recognizes a vehicle by performing pattern matching and the like over the image output by the pre-processing unit 11, and outputs a recognition result to the collision determining unit 20. The white-line recognition unit 17 recognizes a white line by performing pattern matching and the like over the image output by the pre-processing unit 11, and outputs a recognition result to the collision determining unit 20.

The pedestrian recognition unit 18 is configured to recognize a pedestrian image from the image output by the pre-processing unit 11 (input image), and includes inside a candidate-area detecting unit 18a, a pattern comparing unit 18b, a search-window setting unit 18c, and a width determining unit 18d.

Figure 3:
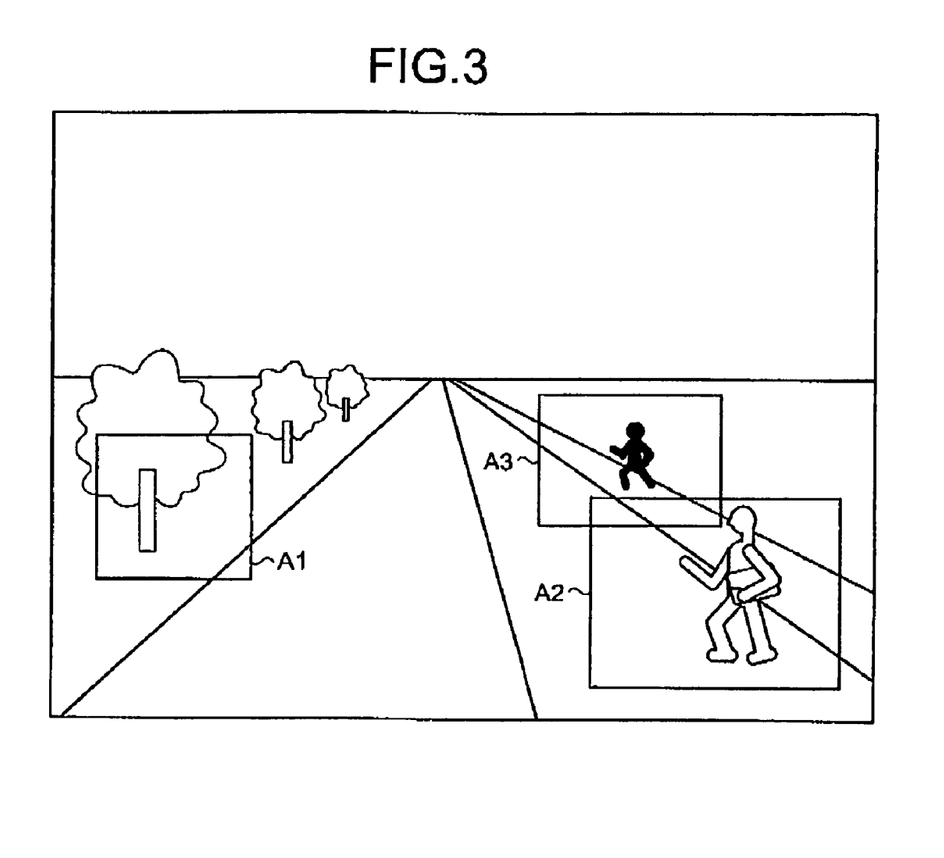
FIG. 3 is a diagram for explaining a selection of a candidate pedestrian area.

The candidate-area detecting unit 18a detects an area where a pedestrian can be present from the image output by the pre-processing unit 11 as a candidate pedestrian area, and outputs the area to the pattern comparing unit 18b as shown in FIG. 3, for example.

In the detection of the candidate pedestrian area, a neural network system or any feature-value calculating algorithms can be employed, for example. In the example shown in FIG. 3, three candidate pedestrian areas A1, A2, and A3 are detected from the image.

The pattern comparing unit 18b compares the detected candidate pedestrian areas with the reference pattern. Since the areas on which the pattern comparison is performed are narrowed down in advance, the processing load can be reduced in comparison with a case where the comparison is performed between the reference pattern and the input image as a whole.

The pattern comparing unit 18b compares the selected candidate pedestrian area with the reference pattern while moving the search window on the image to obtain the transition of the degree of coincidence. Here, the size of the search window is set by the search-window setting unit 18c based on the position of the candidate pedestrian area in the image and the position of the search window in the candidate pedestrian area.

Further, the pattern comparing unit 18b reads out a reference pattern to use from the pattern database 19. When a different reference pattern is stored for each different size of search window in the pattern database 19, the pattern comparing unit 18b selects and reads out a reference pattern which matches with the size of the used search window. Further, when a standardized reference pattern is stored in the pattern database 19, the pattern comparing unit 18b enlarges and reduces the standardized reference pattern so that the pattern matches with the size of the search window.

When there is an area which has substantially the same vertical and horizontal widths as the search window according to the transition of the degree of coincidence obtained by the pattern comparing unit 18b, the width determining unit 18d determines that a pedestrian is present in the area.

The collision determining unit 20 determines a risk of a collision between the vehicle in operation and a pedestrian or other vehicles based on the results of recognition by the vehicle recognition unit 16, the white-line recognition unit 17, and the pedestrian recognition unit 18, a detection result obtained by the radar 33, and positional information output by the navigation device 30.

Specifically, the collision determining unit 20 determines a probability of the occurrence of a collision with a pedestrian or another vehicle, a time of the collision, a distance to a predicted location of the collision, an angle of the collision, and the like, and based on determination results, then outputs to the pre-crash ECU 40 an information display instruction for the display device 43, a warning audio-output instruction for the speaker 44, a braking control instruction, and an EFI control instruction.

Figure 4:
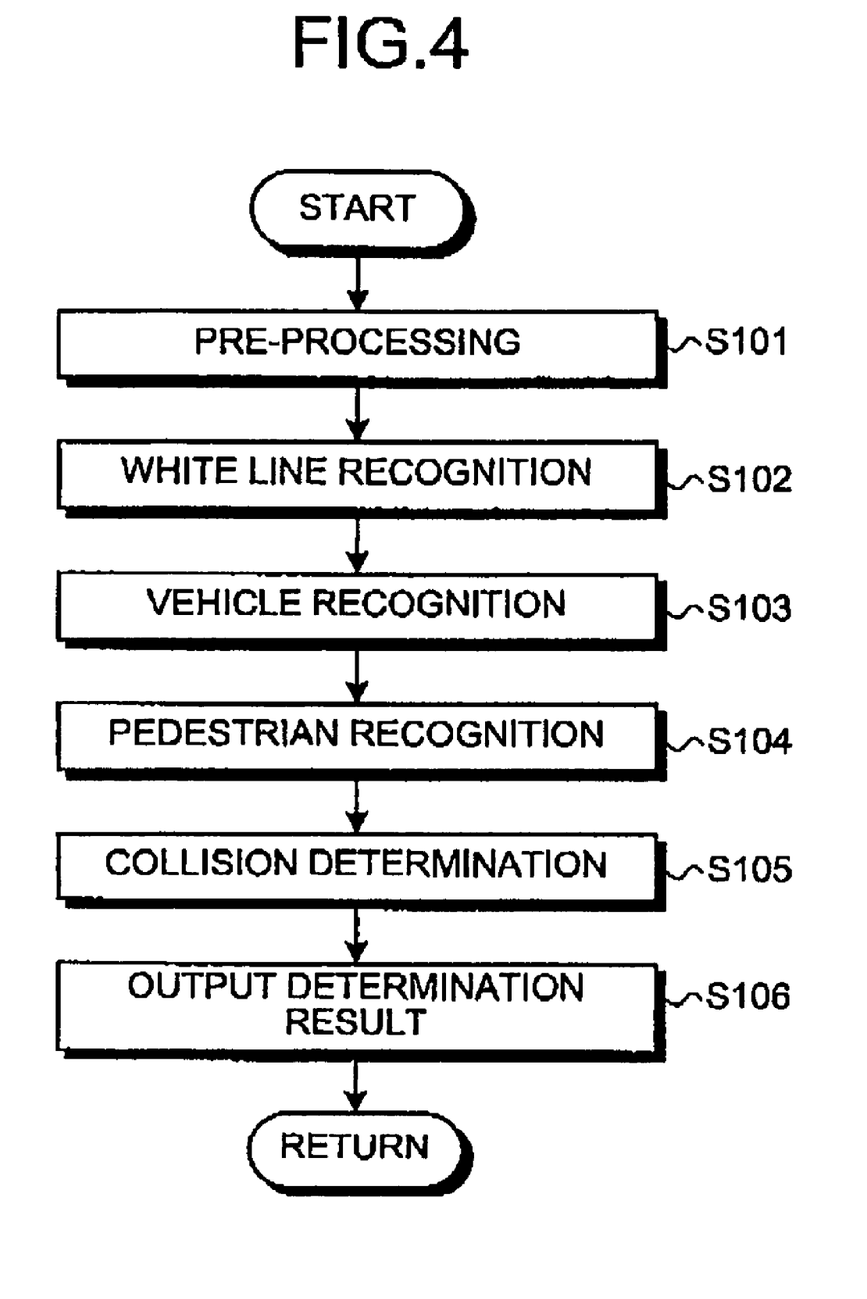
FIG. 4 is a flowchart of a processing procedure performed by the image recognition apparatus according to one embodiment.

An overall processing operation of the image recognition apparatus 10 shown in FIG. 2 will be described with reference to FIG. 4. A process flow shown in FIG. 4 represents a process which starts when a power switch (which may work in conjunction with an ignition switch) is turned on and the camera 31 starts shooting an image. This process is repeatedly performed for processing of each image frame (every few milliseconds, for example).

Firstly, in the image recognition apparatus 10, the pre-processing unit 11 performs processing, such as filtering, edge detection, and contour extraction, on an image shot by the camera 31 (step S101). Then, the white-line recognition unit 16 executes white-line recognition process (step S102) and the vehicle recognition unit 16 executes vehicle recognition process (step S103).

Thereafter, the pedestrian recognition unit 18 executes pedestrian recognition (step S104), the collision determining unit 20 performs collision determination (step S105), and the results of determination are supplied to the pre-crash ECU 40 (step S106). Thus, the process ends.

Figure 5:
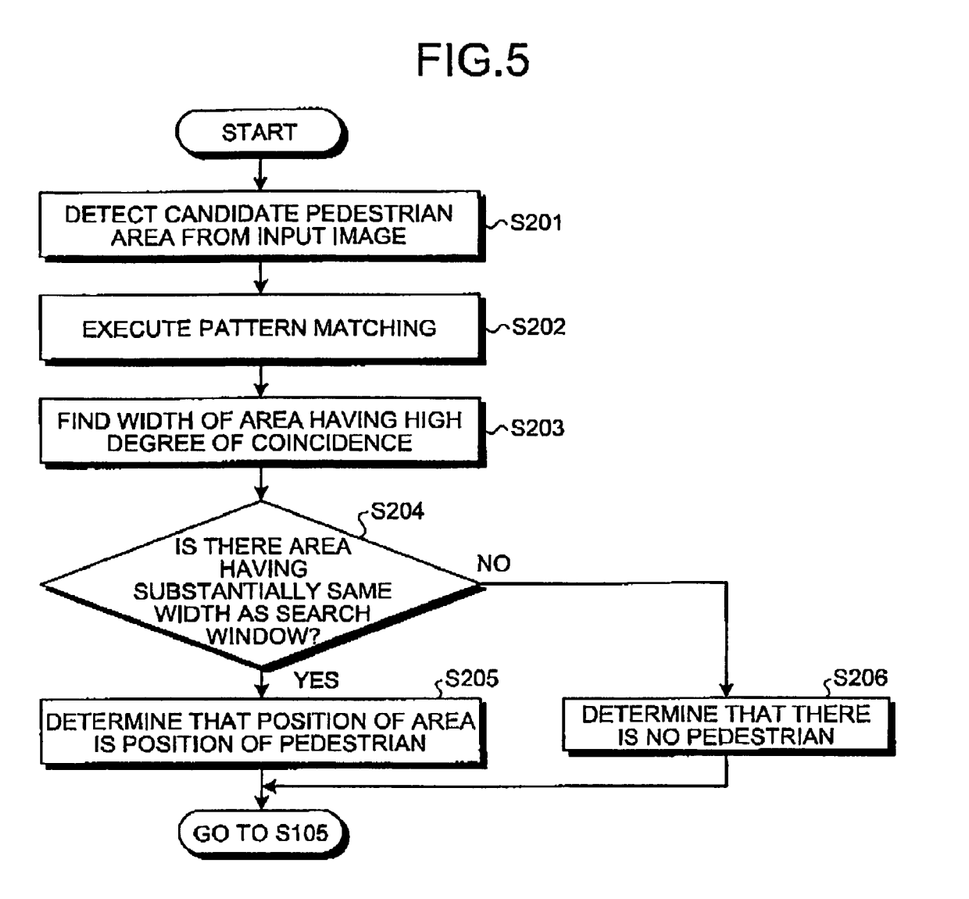
FIG. 5 is a flowchart of a specific processing procedure in a pedestrian recognition process.

Specific details of the process labeled as step 104 performed by the pedestrian recognition unit 18 are shown in FIG. 5. As shown in FIG. 5, the candidate-area detecting unit 18a detects a candidate pedestrian area from an input image (step S201), and the pattern comparing unit 18b performs pattern matching on the candidate pedestrian area (step S202).

The width determining unit 18d finds the width of an area where the degree of coincidence is found to be high as a result of pattern matching (step S203). Then, the width determining unit 18d determines whether there is an area having substantially the same width as the search window (step S204).

If there is an area having substantially the same width as the search window (Yes in step S204), the width determining unit 18d determines that the position of the area is the position of the pedestrian (step S205), and the process ends. On the other hand, if there is no area having substantially the same width as the search window (No in step S204), the width determining unit 18d determines that there is no pedestrian (step S206), and the process ends.

The transition of the degree of coincidence may be obtained for one or both of the vertical direction and the horizontal direction. For example, it is possible to repeatedly scan the image in the horizontal direction while changing the scanned height of the image and the size of the search window. Then, an area having substantially the same horizontal width as the search window can be found at a position which best matches with the reference pattern in vertical and horizontal directions. The position of the found area represents the position of the pedestrian both in the horizontal and the vertical directions.

Alternatively, it is possible to obtain the transition of the degree of coincidence in both the vertical direction and the horizontal direction. Then, when an area having substantially the same horizontal width as the search window is found based on the horizontal transition, and an area having substantially the same vertical width as the search window is found based on the vertical transition, it is determined that the pedestrian is present at the obtained position.

As described above, the image recognition apparatus 10 according to the embodiment obtains the transition of the degree of coincidence between the reference pattern and an image in the search window while moving the search window relative to the input image, and determines that the pedestrian is present in an area where the degree of coincidence is high when the width of the area is within a predetermined range relative to the size of the search window. Thus, the position of the pedestrian image in the image can be found with high accuracy, and accordingly, the relative position of the pedestrian from the vehicle can be calculated with high accuracy.

The configuration and the operation of the embodiment are merely exemplary, and the present invention can be modified appropriately without being limited thereby. For example, though the recognition is performed based on the pattern matching in the embodiment, the present invention is not limited thereto. Any manner of recognition which realizes recognition by cutting out an area to be determined can be employed.

The embodiment is described based on a case where a pedestrian is recognized as a specific object. The present invention, however, is similarly applicable to the recognition of other object, such as a falling object on a road.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image recognition apparatus comprising:
   a memory; and
   a processor coupled to the memory, wherein the processor is programmed to perform as:
      a comparing unit that sequentially compares a reference pattern with an image in a search window having a shape corresponding to a size of an object to be determined in an input image while moving the search window relative to the input image to acquire a degree of coincidence between the reference pattern and the image in the search window; and
      a determining unit that finds a width of an area where the degree of coincidence is equal to or higher than a predetermined value, compares the width of the area and a width of the search window, and determines that an object corresponding to the reference pattern is present in the area when the difference between the width of the area and the width of the search window falls within a predetermined margin.

2. The image recognition apparatus according to claim 1, wherein
   the comparing unit acquires a transition of the degree of coincidence by moving the search window in a horizontal direction of the input image, and
   the determining unit determines that the object corresponding to the reference pattern is present in the area when the difference between the width of the area and a horizontal width of the search window falls within the predetermined margin.

3. The image recognition apparatus according to claim 1, wherein
   the comparing unit acquires a transition of the degree of coincidence by moving the search window in a vertical direction of the input image, and
   the determining unit determines that the object corresponding to the reference pattern is present in the area when the difference between the width of the area and a vertical width of the search window falls within the predetermined margin.

4. The image recognition apparatus according to claim 1, wherein
   the comparing unit acquires a transition of the degree of coincidence by moving the search window in a vertical direction and a horizontal direction of the input image, and
   the determining unit determines that the object corresponding to the reference pattern is present in the area when both a horizontal difference between a horizontal width of the area and a horizontal width of the search window and a vertical difference between a vertical width of the area and a vertical width of the search window fall within the predetermined margin.

5. The image recognition apparatus according to claim 1, wherein
   the shape of the search window is determined according to a height in the image.

6. The image recognition apparatus according to claim 1, wherein
   the determining unit finds the width of the area based on a number of points where the degree of coincidence exceeds a threshold value and consecutiveness of the points where the degree of coincidence exceeds the threshold value.

7. The image recognition apparatus according to claim 1, wherein
   the reference pattern is a pattern corresponding to a pedestrian, and
   the determining unit recognizes the pedestrian.

8. The image recognition apparatus according to claim 1, further comprising:
   a candidate area selecting unit that selects a candidate area from the input image, the candidate area being an area in which the object corresponding to the reference pattern can be present, wherein the comparing unit compares the candidate area with the reference pattern while moving the search window relative to the candidate area.

9. An image recognition method comprising:

sequentially comparing a reference pattern with an image in a search window having a shape corresponding to a size of an object to be determined in an input image while moving the search window relative to the input image to acquire a degree of coincidence between the reference pattern and the image in the search window;

finding a width of an area where the degree of coincidence is equal to or higher than a predetermined value;

comparing the width of the area and a width of the search window; and determining, using a processor that an object corresponding to the reference pattern is present in the area when the difference between the width of the area and the width of the search window falls within a predetermined margin.

10. An electronic control device comprising:

a memory;

a processor coupled to the memory; and an electronic control unit that operates based on a process performed by the processor, wherein the processor is programmed to perform as:

a comparing unit that sequentially compares a reference pattern with an image in a search window having a shape corresponding to a size of an object to be determined in an input image while moving the search window relative to the input image to acquire a degree of coincidence between the reference pattern and the image in the search window; and a determining unit that finds a width of an area where the degree of coincidence is equal to or higher than a predetermined value, compares the width of the area and a width of the search window, and determines that an object corresponding to the reference pattern is present in the area when the difference between the width of the area and the width of the search window falls within a predetermined margin, wherein the electronic control unit controls, when a collision with the object corresponding to the reference pattern is predicted based on a result of determination by the processor, an operation of a vehicle, or a notification to a driver, or both.

* * * * *